(12) United States Patent
Riley et al.

(10) Patent No.: US 9,190,054 B1
(45) Date of Patent: Nov. 17, 2015

(54) NATURAL LANGUAGE REFINEMENT OF VOICE AND TEXT ENTRY

(71) Applicant: Google Inc., Mountain View, CA (US)

(72) Inventors: Michael D Riley, Mountain View, CA (US); Johan Schalkwyk, Mountain View, CA (US); Cyril Georges Luc Allauzen, Mountain View, CA (US); Ciprian Ioan Chelba, Mountain View, CA (US); Edward Oscar Benson, Mountain View, CA (US)

(73) Assignee: Google Inc., Mountain View, CA (US)

( * ) Notice: Subject to any disclaimer, the term of this patent is extended or adjusted under 35 U.S.C. 154(b) by 297 days.

(21) Appl. No.: 13/799,619

(22) Filed: Mar. 13, 2013

Related U.S. Application Data

(60) Provisional application No. 61/618,782, filed on Mar. 31, 2012.

(51) Int. Cl.
| | | |
|---|---|---|
| G10L 15/04 | (2013.01) | |
| G10L 15/18 | (2013.01) | |
| G10L 15/183 | (2013.01) | |
| G06F 17/30 | (2006.01) | |
| G10L 15/22 | (2006.01) | |
| G10L 15/19 | (2013.01) | |
| G06F 17/27 | (2006.01) | |

(52) U.S. Cl.
CPC .......... *G10L 15/18* (2013.01); *G06F 17/30672* (2013.01); *G10L 15/183* (2013.01); *G06F 17/27* (2013.01); *G06F 17/277* (2013.01); *G10L 15/19* (2013.01); *G10L 15/22* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,303,299 | A * | 4/1994 | Hunt et al. | 379/88.01 |
| 5,829,000 | A * | 10/1998 | Huang | G10L 15/22 704/240 |
| 7,475,010 | B2 * | 1/2009 | Chao | 704/10 |
| 7,881,936 | B2 * | 2/2011 | Longe | G06K 9/00422 704/257 |
| 8,762,156 | B2 * | 6/2014 | Chen | 704/275 |
| 2003/0023439 | A1 * | 1/2003 | Ciurpita et al. | 704/246 |
| 2004/0148170 | A1 * | 7/2004 | Acero et al. | 704/257 |
| 2005/0149326 | A1 * | 7/2005 | Hogengout et al. | 704/242 |
| 2005/0177376 | A1 * | 8/2005 | Cooper et al. | 704/277 |
| 2005/0197829 | A1 * | 9/2005 | Okumura | 704/10 |
| 2007/0094022 | A1 * | 4/2007 | Koo | G06K 9/723 704/251 |
| 2008/0126091 | A1 * | 5/2008 | Clark et al. | 704/246 |
| 2011/0307245 | A1 * | 12/2011 | Hanneman et al. | 704/4 |
| 2012/0265528 | A1 * | 10/2012 | Gruber et al. | 704/235 |
| 2012/0296627 | A1 * | 11/2012 | Suzuki et al. | 704/2 |

OTHER PUBLICATIONS

Wikipedia, "Siri (software)", http://en.wikipedia.org/wiki/Siri_(software), Jan. 15, 2013, 13 pages.

* cited by examiner

*Primary Examiner* — Richard Zhu
(74) *Attorney, Agent, or Firm* — Harrity & Harrity, LLP

(57) ABSTRACT

A data processing apparatus is configured to receive a first string related to a natural-language voice user entry and a second string including at least one natural-language refinement to the user entry; parse the first string into a first set of one or more tokens and the second string into a second set of one or more tokens; determine at least one refining instruction from the second set of one or more tokens; generate, from at least a portion of each of the first string and the second string and based on the at least one refining instruction, a group of candidate refined user entries; select a refined user entry from the group of candidate refined user entries; and output the selected, refined user entry.

20 Claims, 12 Drawing Sheets

NATURAL LANGUAGE REFINEMENT OF VOICE AND TEXT ENTRY

RELATED APPLICATION

This application claims priority to U.S. Provisional Application No. 61/618,782, filed Mar. 31, 2012, the entire contents of which are hereby incorporated by reference.

BACKGROUND

The human-machine interface of any automated system, such as a computer or smart phone, requires provisions for accepting data entry from a user. Some examples of data entry devices include keyboards, cursor positioning devices, such as touch pads, joysticks, trackballs, and mice, and speech recognition systems.

Recent trends in user interfaces favor those containing speech recognition systems. Such user interfaces generally include software specially configured to interpret audio signals obtained from a microphone into digital codes according to a user's voice, speech patterns and pronunciation of words. Such systems generally require some level of training.

SUMMARY

Described herein are devices and techniques for allowing a user to interact with an automated device in a conversational, natural-language manner. In particular, users are allowed to correct or otherwise refine user entries, such as instructions or commands, by using a natural-language dialog that may include explicit or implicit instructions for the implementation of such instructions.

In some possible implementations, a method, performed by one or more processors of a data processing apparatus, may include receiving a first string related to a natural-language voice user entry and a second string including at least one natural-language refinement to the user entry; parsing the first string into a first set of one or more tokens and the second string into a second set of one or more tokens; determining at least one refining instruction from the second set of one or more tokens; generating, from at least a portion of each of the first string and the second string, and based on the at least one refining instruction, a group of candidate refined user entries; selecting a refined user entry from the group of candidate refined user entries; and outputting the selected, refined user entry.

In some possible implementations, each candidate refined user entry, of the group of candidate refined user entries, may include a respective combination of one or more tokens from each of the first string and the second string.

In some possible implementations, selecting the refined user entry of the group of candidate refined user entries may include generating a score for each candidate refined user entry of the group of candidate refined user entries, where the score may be indicative of a quality of the candidate refined user entry of the group of candidate refined user entries; and selecting one of the group of candidate refined user entries based on the score of the one of the group of candidate refined user entries.

In some possible implementations, generating the score may include determining a measure of edit distance between each candidate refined user entry, of the group of candidate refined user entries, and the first string.

In some possible implementations, the method may further include limiting a number of candidate refined user entries generated based on the at least one refining instruction.

In some possible implementations, selecting the refined user entry of the group of candidate refined user entries may include determining one or more features of at least one of the one or more tokens of each of the first string and the second string; and selecting one of the group of candidate refined user entries resulting from substitution of tokens having at least one common feature of the one or more features.

In some possible implementations, the one or more features may include one or more of syntactic features or semantic features.

In some possible implementations, the method may further include providing the selected, refined user entry to a search engine, where the selected, refined user entry may correspond to a search query.

In some possible implementations, a system may include one or more computers to: receive a first string related to a natural-language voice user entry and a second string including at least one natural-language refinement to the user entry; parse the first string into a first set of one or more tokens and the second string into a second set of one or more tokens; determine at least one refining instruction from the second set of one or more tokens; generate, from at least a portion of each of the first string and the second string and based on the at least one refining instruction, a group of candidate refined user entries; select a refined user entry from the group of candidate refined user entries; and output the selected, refined user entry.

In some possible implementations, the one or more computers, when determining the at least one refining instruction, may identify grammatical features from the second set of one or more tokens.

In some possible implementations, the one or more computers may further interpret semantic features from the first set of one or more tokens and the second set of one or more tokens.

In some possible implementations, the one or more computers, when generating the group of candidate refined user entries, may use information from a learned model, trained from user entry logs, to generate the group of candidate refined user entries.

In some possible implementations, the user entry logs may be search engine query logs.

In some possible implementations, a method, performed by one or more computers, may include receiving, from a log of user entry strings, a group of pairs of successive user entry strings, in which a second user entry string, of each respective pair of successive user entry strings, corresponds to a refinement of a first user entry string of the respective pair of successive user entry strings; parsing each of the first user entry string and the second user entry string, of a respective pair of successive user entry strings, into one or more tokens; discarding pairs of successive user entry strings, in which tokens of the second user entry string of the pair of successive user entry strings are substantially a subset of tokens of the first user entry string of the pair of successive user entry strings; generating a third string including at least one natural-language refinement adapted to produce the second user entry string of the pair of successive user entry strings when applied to the first user entry string of the pair of successive user entry strings; and logging an association of the respective pair of user entry strings and the generated third string.

In some possible implementations, the method may further include excluding, from logging, pairs of user entry strings not repeated at least a threshold number of times.

In some possible implementations, each pair of successive user entry strings, of the group of pairs of successive user entry strings, may have been logged in the log of user entry strings within a respective period of time.

In some possible implementations, a computer-readable storage medium may be encoded with instructions. The instructions may include a group of instructions which, when executed by one or more processors, cause the one or more processors to: receive a first string related to a natural-language voice user entry and a second string including at least one natural-language refinement to the user entry; parse the first string into a first set of one or more tokens and the second string into a second set of one or more tokens; determine at least one refining instruction from the second set of one or more tokens; generate, from at least a portion of each of the first string and the second string and based on the at least one refining instruction, a group of candidate refined user entries; select a refined user entry from the group of candidate refined user entries; and output the selected, refined user entry.

In some possible implementations, the at least one refining instruction may include at least one of a delete instruction, an insert instruction, or a substitute instruction.

In some possible implementations, one or more instructions, of the group of instructions, to determine the at least one refining instruction may include one or more instructions which, when executed by the one or more processors, cause the one or more processors to identify, within the second set of one or more tokens, one or more keywords indicative of the at least one refining instruction.

In some possible implementations, one or more instructions, of the group of instructions, to determine the at least one refining instruction may include one or more instructions which, when executed by the one or more processors, cause the one or more processors to determine the at least one refining instruction from the second set of one or more tokens.

In some possible implementations, a system may include means for receiving a first string related to a natural-language voice user entry and a second string including at least one natural-language refinement to the user entry; means for parsing the first string into a first set of one or more tokens and the second string into a second set of one or more tokens; means for determining at least one refining instruction from the second set of one or more tokens; means for generating, from at least a portion of each of the first string and the second string, and based on the at least one refining instruction, a group of candidate refined user entries; means for selecting a refined user entry from the group of candidate refined user entries; and means for outputting the selected, refined user entry.

Some implementations of the subject matter described in this specification can be implemented so as to realize one or more of the following advantages. A user is allowed to interact with an automated device in a conversational, natural-language manner. In particular, a user is allowed to correct or otherwise refine voiced user entries, such as instructions or commands, by using a natural-language dialog that may include explicit or implicit instructions for the implementation of such instructions. Automatic refinement or correction of initial user entries allows for processing of desired user entries without unnecessarily processing undesired entries, e.g., resulting from erroneous inputs or misinterpretations of speech processing systems. Such automatic refinement or correction features improve efficiency with regard to resources, such as processing and communication resources, while also reducing processing time. Such advantages are beneficial in search engine applications in which automatic refinement or correction of search queries can prevent processing of undesired search queries that would otherwise expend valuable resources, e.g., expending processing resources and storage resources for query logs.

Further implementations, features, and advantages of the disclosure, as well as the structure and operation of the various aspects of the disclosure are described in detail below with reference to accompanying drawings.

DESCRIPTION

In the following detailed description of the various implementations, reference is made to accompanying drawings, which form a part thereof, and within which are shown by way of illustration, specific implementations, by which one or more of the devices, systems and techniques described herein may be practiced. It is to be understood that other implementations may be utilized and structural changes may be made as appropriate.

Described herein are devices and techniques for providing a user interface that allows user interaction with a machine, such as a processing and/or communications device, in a more natural, conversational manner. More particularly, a user interface is enhanced or otherwise supplemented by a user refinement capability to allow natural-language refinements of user entries or input. For example, a user entry, such as an instruction, a command, or a query, is received at a user interface. If the user subsequently chooses to modify the entry, the user provides a subsequent entry, a refinement, in a brief conversational manner. The user refinement capability determines a revised entry given the original entry and the subsequent refinement, without requiring the user to provide a complete refined entry. Although such modified or supplemented user interfaces are intended to encompass all user interfaces, without limitation, the conversational tone of such entries is particularly well suited to vocalized or voice entries. Examples of user entries are illustrated in Table 1.

TABLE 1

Examples of User Entry Refinements

| | |
|---|---|
| User Entry (S₁): | "Korean food." |
| Refinement (S₂): | "Northern Italian instead." |
| Refined Entry(S₃): | Northern Italian food |
| User Entry (S₁): | "Romantic restaurant" |
| Refinement (S₂): | "French" |
| Refined Entry(S₃): | French restaurant |
| User Entry(S₁): | "Sports clubs in Boston" |
| Refinement (S₂): | "How about Cambridge?" |
| Refined Entry(S₃): | Sports clubs in Cambridge |

The user entry refinement can be defined as a "triple"<$S_1$, $S_2$, $S_3$> in which the user issues an initial entry string $S_1$ and proceeds to enter a refining phrase string $S_2$, with the intent of producing a refined user entry string $S_3$. The example user entries represent search strings and refinements thereto. In a first example, the user entry $S_1$ is "Korean food." The user subsequently decides to refine the user entry, such as a search query, to Northern Italian food, reciting $S_2$, "Northern Italian instead" in a conversational manner. A refined entry $S_3$ is generated, ideally approximating the desired result, namely, $S_3$ "Northern Italian food."

Figure 1A:
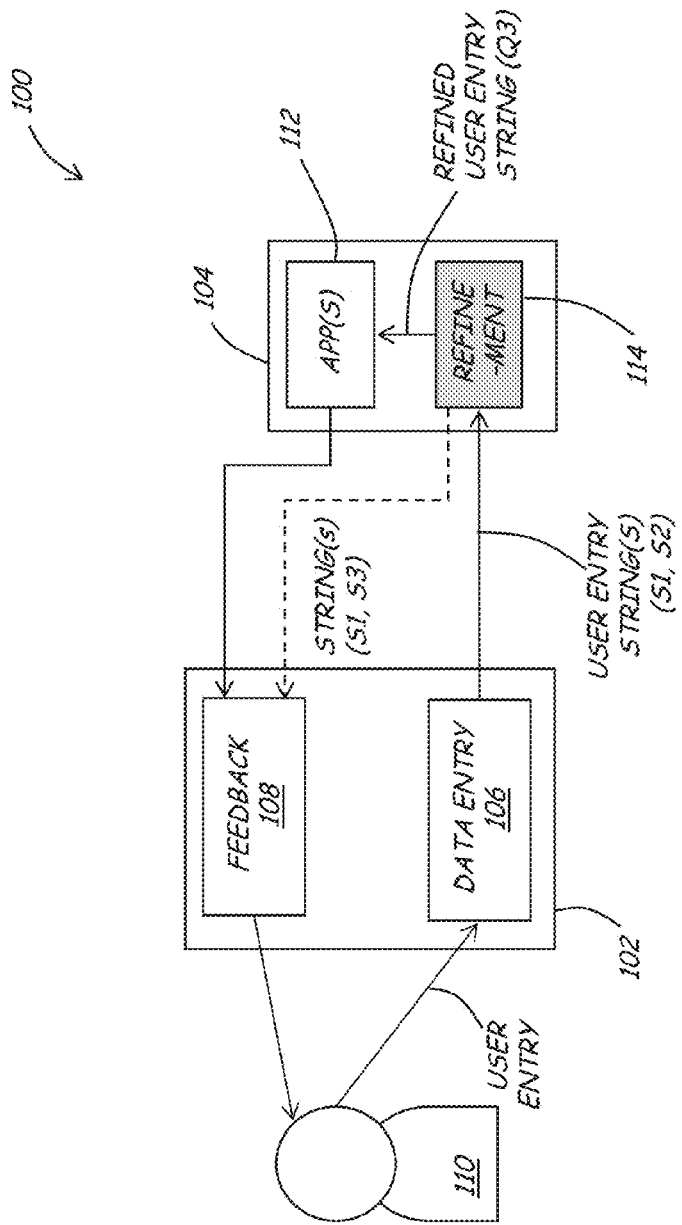
FIG. 1A shows a functional block diagram of some implementations of a system for refining a user entry in response to natural language instruction.

FIG. 1A shows a functional block diagram of some implementations of a system 100 for refining a user entry in response to natural-language instruction. The system 100 includes a user interface 102 and a processing device 104. The user interface 102 includes a data entry device 106 for accepting a user entry and encoding the user entry as may be required for processing by the processing device 104. Some examples of data entry devices 106 include keyboards, cursor positioning devices, mice, and microphone and speech recognition processes, to name a few. User entries, particularly natural-language user entries, include words that may be spoken or typed. The data entry device 106 receives a natural-language entry from a user 110 and encodes the entry for further processing. At least one example of such encoding is a character string representative of the user entry. In at least some implementations, the user interface 102 also includes a user feedback device 108 adapted for providing the user 110 with some form of feedback. Examples of such feedback devices 108 include one or more of textual and/or graphical displays and speech synthesizers and speakers alone or in combination.

In the illustrative example, the processing device 104 includes one or more applications 112 and a user entry refinement engine 114. The one or more applications 112 can include traditional applications, such as web browsers, email, short message service communications, word processors, and the like. More generally, the applications 112 can include any process accessible to the user 110 through the user interface 102. For example, the application 112 can include processes hosted by the processing device 104, such as an operating system, as well as web-accessible processes, such as search engines.

In the illustrative example, the user entry refinement engine 114 is positioned to intercept encoded user entries, such as user entry strings, before the entries are forwarded to the one or more applications 112. It is understood that in some implementations, encoded user entries can be provided to the one or more applications 112 and the user entry refinement engine 114 substantially in parallel. As described herein and without limitation, in at least some implementations, the user entry refinement engine 114 is configured to determine whether a particular user entry constitutes a refinement to a previous user entry.

For example, attributes related to one or more user entries can be used to make such a determination. Such user entries include one or more of any initial user entry and any subsequently refining or corrective user entry. For example, a time difference can be measured between two entries and compared to a threshold value. The comparison can be used as an indicator that the entries are either possibly related as a refinement or correction, the time difference is not greater than the threshold value, or otherwise possibly unrelated. Other indicators can be obtained from one or more words of a user entry itself. For example, if a second user entry is a refinement of a first user entry, the second entry may contain certain keywords, such as "no," "add," "delete," "instead" or the like. Still further indicators can be obtained from lexical, syntactic or semantic similarities or differences between successive user entries, for example, presuming a refining user entry to include some level of semantic similarity to the initial user entry, such as synonyms or parts of speech.

For corrective applications, for example, in which a speech interpreter misinterprets a word, such that a correction is necessary, such indicators can include prosodic attributes, such as the user's (speaker's) rhythm, stress and intonation of speech, as in an interrogatory, and/or in similarities between phonology, such as phonemes of one or more words in the user entry and corrective user entry, phonemes, number of syllables. Upon determining such refinements, the user entry refinement engine 114 generates a refined user entry from the original user entry and the refinement. The user entry refinement engine 114 forwards the refined user entry, such as a refined user entry string, to the one or more applications 112 for processing.

In at least some implementations, the user feedback device 108 receives output from the one or more applications 112, providing the user 110 with feedback that may include one or more responses to a refined user entry. The responses can include one or more of textual, graphical or audio responses. For example, an initial voice user entry instructing the processing device 104 to play a musical selection, such as "Select jazz genre in shuffle mode," might be followed by a subsequent natural-language voice user entry refining the original user entry, such as "Make it Latin." The data entry device 106 encodes the user entry and forwards it to the user entry refinement engine 114. The user entry refinement engine 114 determines that subsequent user entries constitute a user entry-refinement pair, and in response generates a refined user entry based on the user entry and the refinement, such as "Select Latin jazz in shuffle mode." The user-entry refinement engine 114 forwards the refined user entry to a media application, such as a music player, which responds in due course to the refined user entry. In the illustrative example, the user 110 receives the music selection based on the refined user entry.

In at least some implementations, the user entry refinement engine 114 is also in communication with the user feedback device 108 (connection shown in phantom). In such configurations, the user 110 is provided with feedback of one or more of the original user entry string and the resulting refined string. Feedback of the original user input is beneficial in allowing the user 110 to determine whether an error may have occurred during encoding of the original user input by the data entry device 106. Feedback is also beneficial to allow the user 110 to assess whether the user entry refinement engine 114 properly interpreted the user entry refinement, generating a refined user entry that corresponds to the user's desired refined entry. In at least some implementations, the system 100 can be configured to allow the user 110 to further modify or otherwise alter such automatically generated refined user entries. For example, if the user 110 upon receiving feedback of a generated refined user entry determines that the entry is incorrect, or otherwise requires further refinement, the user can provide yet another entry to update or otherwise alter processing of the generated refined user entry by the one or more applications 112. Thus, a user may provide a further user entry such as "No" or "Try again," in response to user feedback of the generated refined user entry. The user entry refinement engine 114, upon receiving such further user entries, can respond as appropriate.

Figure 1B:
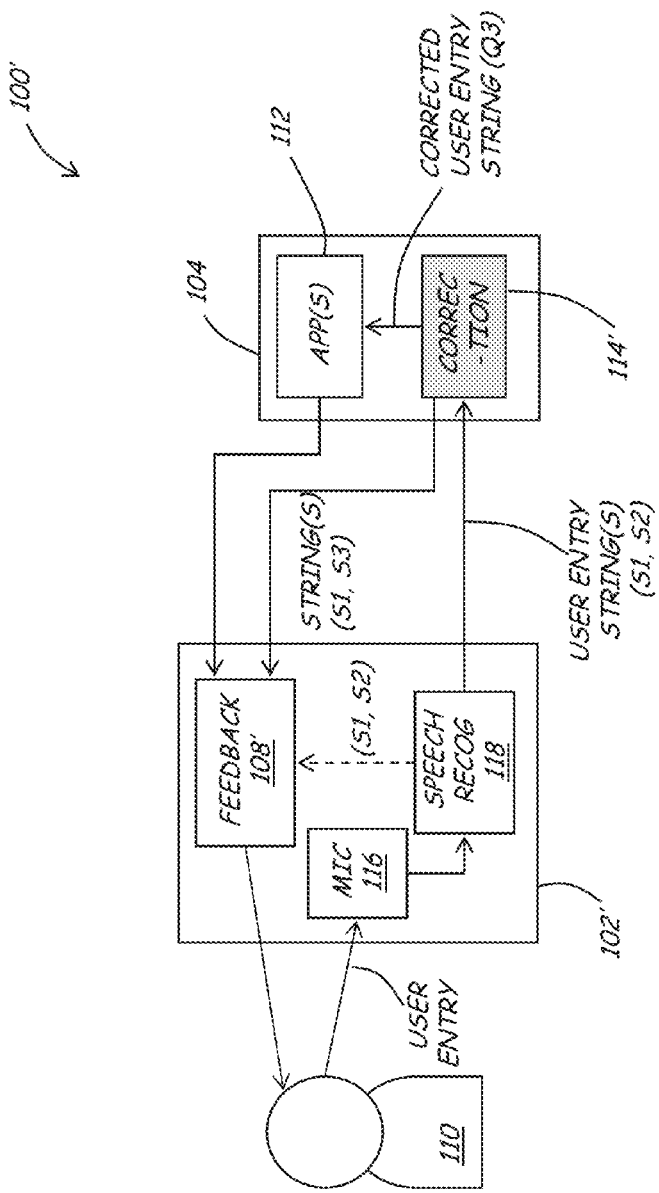
FIG. 1B shows a functional block diagram of some implementations of a system for correcting a user voice entry in response to natural language voice instruction.

FIG. 1B shows a functional block diagram of another implementation of a system 100' for correcting a user voice entry in response to natural language voice instruction. The system 100' includes a user interface 102' with a data entry device including microphone 116 and speech recognizer 118. The illustrative system 100' is particularly well suited for entries in the form of spoken words. The microphone 116 receives a voice entry and converts the entry to a corresponding audio signal. The speech recognizer 118 receives the audio signal and generates an encoded form of the user input suitable for processing by the processing device 104'. For example, the speech recognizer 118 is a speech processor configured to generate an alpha-numeric string corresponding to a textual representation of the spoken user entry. In at least some implementations, the encoded user entry is forwarded from the speech recognizer 118 to the user feedback device 108' allowing the user 110 to determine whether the speech recognizer properly interpreted the spoken user entry. To the extent that the user 110 determines that a correction is necessary, the user 110 provides a subsequent user entry, for example, also in the form of natural-language spoken words.

Once again, the processing device 104' includes one or more applications 112 and a user entry correction engine 114'. The user entry correction engine 114' is similarly positioned to intercept encoded user entries, such as user entry strings, before the entries are forwarded to the one or more applications 112. It is understood that in some implementations, encoded user entries can be provided to the one or more applications 112 and the user entry correction engine 114' substantially in parallel. As described herein and without limitation, the user entry correction engine 114' is configured to discern whether a particular user entry constitutes a correction to a pervious user entry. Upon determining such corrections, the user entry correction engine 114' generates a corrected user entry from the original user entry and the correction. The user entry correction engine 114' forwards the corrected user entry, such as a corrected user entry string, to the one or more applications 112 for processing. The refinements of the previous illustrative example can be considered corrections in the current example. A user 110 may determine that corrections are necessary from recognition that the user 110 provided an erroneous initial command. Alternatively or in addition, the user 110 may determine that correction is necessary in response to feedback from the user feedback device 108' indicating that an error was introduced into the original user entry, for example, during speech recognition and/or encoding.

It is desirable to produce a refinement or correction string $S_3$ corresponding to an intended refinement or correction, given only an initial user entry string and subsequent refinement or correction string $<S_1,S_2>$. In at least some implementations, a user entry refinement/correction engine produces one or more candidate refined/corrected user entries $S_3$, referred to herein as alignments. An alignment A, between $S_1$ and $S_2$, represents a mapping of one or more tokens in $S_1$ to tokens in some candidate $S_3$, such that a measure of string difference corresponds to the refining/corrective user entry, $S_3-S_1=S_2$. Example alignments for the first example of Table 1 are illustrated in Table 2.

TABLE 2

Example Alignments

| | | | |
|---|---|---|---|
| Replacement: | Korean | restaurant | |
| | Northern Italian | restaurant | |
| Insertion: | | Korean | restaurant |
| | Northern | Italian | restaurant |
| Two replacements: | Korean | restaurant | |
| | Northern | Italian restaurant | |

Shown in Table 2 are examples of multiple alignments of $S_1$, $S_2$ that produce the same refined/corrected entry $S_3$. In a replacement example, an initial user entry "Korean restaurant" is parsed into two single-word tokens. A refining entry, such as "Northern Italian instead" may result in the example alignment "Northern Italian restaurant" as shown. In the example alignment, a two-word token "Northern Italian" has been aligned with "Korean" representing an alignment. Thus, the token "Korean" is replaced with the token "Northern Italian."

Continuing with the same example, but instead implementing an alignment as an insertion, the token "Korean" is aligned with "Italian," having semantic similarities. The token "restaurant" is aligned with itself, and the token "Northern" is included as an insertion—a third token of the aligned user entry.

In yet another implementation of the same example, an alignment can be prepared as two replacements. Once again, the initial user entry is parsed into two tokens as shown. The token "restaurant" of the first entry is replaced by "Italian restaurant" in the illustrated alignment. Likewise, the token "Korean" is replaced by "Northern."

Figure 2A:
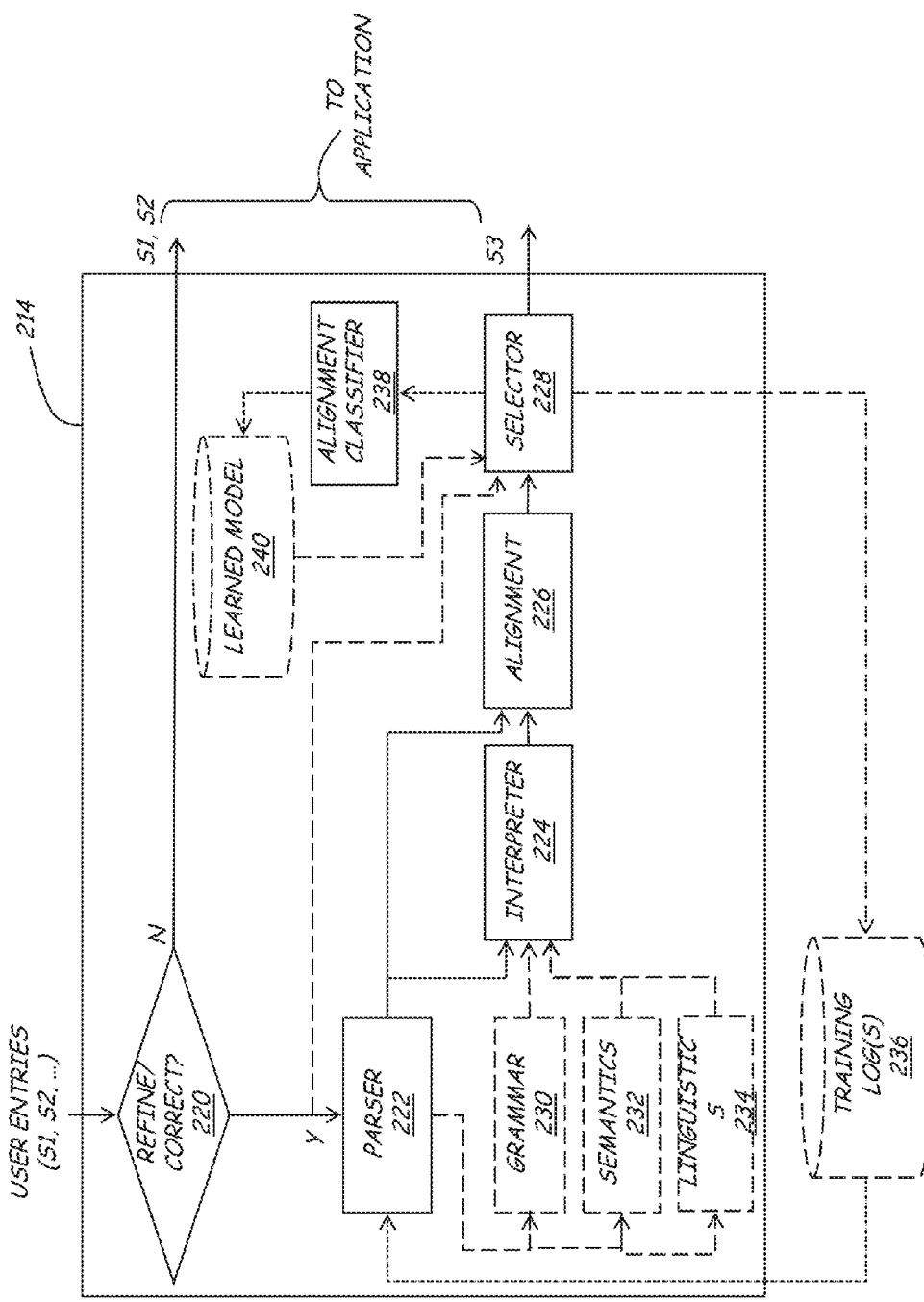
FIG. 2A shows a more detailed functional block diagram of some implementations of a user refinement/correction engine.

FIG. 2A shows a more detailed functional block diagram of some implementations of a user refinement/correction engine 214. The refinement/correction engine 214 receives encoded user entry strings $S_1$ and user entry refinement strings $S_2$. In some implementations, the refinement/correction engine 214 includes a filter module 220 to discriminate or otherwise identify subsequent user entries as entry-refinement pairs $S_1$, $S_2$. For example, such a filter module 220 can include a temporal gating function, such that entries received after some delay threshold time are ignored. In the illustrative example, user entries $S_1$, $S_2$ would simply be passed on for further processing, for example, being forwarded to the intended application 112 (FIGS. 1A and 1B). User entries passed on by the filter module 220 are received by a parser 222. For string entries $S_1$, $S_2$, the parser 222 is configured to parse each string $S_1$, $S_2$ into a respective set of one or more tokens. Strings can be delimited by words, such that each token is considered an n-gram of one or more consecutive words of a string.

The refinement/correction engine 214 also includes an interpreter 224, an alignment processor 226, and an alignment selector 228. In operation, the interpreter 224 receives parsed user entry strings from the parser 222 and provides some level of interpretation based on one or more features of the tokens of the parsed user entry string $S_1$, $S_2$. The alignment processor 226 is in communication with the parser 222 and with the interpreter 224. The alignment processor 226 also receives parsed user entry strings from the parser 222, as well as any level of interpretation provided by the interpreter 224 based on one or more features of the tokens of the parsed user entry strings $S_1$, $S_2$. In refinement applications, such features can include one or more of: lexical, grammatical, syntactic, or semantic. In corrective applications, such features can include alternatively or in addition, one or more of: phonology, such as phonemes of one or more words in the user entry and corrective user entry, such as phonemes, number of syllables, and homophones. In at least some implementations, any level of interpretation provided by the interpreter 224 can be used to restrict or otherwise limit the number of candidate refined alignments presented to the selector 228. Without such restriction, candidate refined alignments might otherwise include all possible combinations of the tokens of each of the user entry strings, in which the tokens are derived as single words, or multiple words, referred to herein as n-grams, up to some threshold n (n≥1), such as two or three word n-grams. Preparation and evaluation of less than all possible candidate alignments can result in a processing efficiency, reducing processing burden, memory storage requirements, and user response observed during runtime. With respect to n-grams, multi-word n-grams can be useful in interpreting multi-word representations, such as "New York."

In general, any determined features can be tagged or otherwise associated with parsed tokens. In candidate alignments, similarity or differences of one or more features tagged to corresponding, aligned, tokens can be used to make a determination as to a suitability or unsuitability of a particular alignment. In at least some implementations, tokens are stored in a data structure, such as an array. Such data structures can be configured to store additional information, such as tags, as may be applied to one or more tokens of a user entry. Thus, a multidimensional array can store for each element, a multitude of values, such as a token value and one or more associated tags.

At least some features that can be used by the interpreter 224 include one or more of linguistic features including grammar, syntactic, semantics, lexicography and phonologic features, such as phonemes and homophones. In the illustrative example, the refinement/correction engine 214 is shown to optionally include one or more of a grammar interpreter 230, a semantic interpreter 232 and a linguistics interpreter 234 (each shown in phantom). Each of these interpreters 230, 232, 234 can be an independent module as shown, or included as distinguishable features within the interpreter 224.

The grammar interpreter 230 receives parsed user entry strings from the parser 222. Each of the tokens can be examined individually or collectively to identify distinguishable grammatical features. For example, one or more of the tokens can be identified as belonging to a list of keywords. Keywords can be predetermined, for example, according to a particular application. In the context of refinements or corrections, such keywords can include words or phrases that might be expected in a natural language refinement or correction. Examples of such words and phrases include: "replace," "instead of," "substitute" and "delete." Gaining an understanding of such keywords can be beneficial for the interpreter 224 by allowing it to further limit the number of alignments necessary from the alignment processor 226.

In general, with respect to refinements and corrections, instructions associated with refining or correcting a first user entry $S_1$ according to a subsequent user refinement/correction $S_2$ can be grouped into a relatively short list of categories. Namely, the refinement/correction $S_2$ is one of: (i) an insertion, (ii) a deletion, or (iii) a substitution or update. Identification of keywords as might be accomplished by the grammar interpreter 230 can assist in determining which category of refinement/correction is appropriate given the entry-refinement pair $S_1$, $S_2$.

The semantic interpreter 232 also receives parsed user entry strings from the parser 222. Each of the tokens can be examined individually or collectively to identify associated semantics. For example, a token can be interpreted as relating to an indicator of national origin, for example, Korean, Japanese, or to an activity, for example, dining, sports, baseball, concert, opera. Having an understanding of semantics of one or more tokens of each of the entry-refinement pair $S_1$, $S_2$ can be provided to the alignment processor 226 to assist in limiting the number of alignments. For example, if the user entry $S_1$ includes a location, such as "Boston," user refinement $S_2$ includes a location, such as "Cambridge," and the instruction is determined to be a substitute by the grammar interpreter 230, only those alignments substituting a place, for example Boston, for a place, such as Cambridge, can be included in a collection of candidate alignments of refined/corrected user entry string $S_3$. Numbers of syllables might be detected, for example, by counting phonemes between pauses occurring within a vocalized user entry. Once again, similarities among phonemes of a word, e.g., interpreted between pauses, can be used as an indication of similarities in sounds. Semantics might be interpreted with the assistance of a dictionary, or other suitable database of semantic descriptions of words and/or phrases.

The linguistics interpreter 234 also receives parsed user entry strings from the parser 222. Each of the tokens can be examined individually or collectively to identify associated linguistic features. For example, a token can be interpreted as relating to an indicator of a number of syllables, or associated sounds or phonemes. Having an understanding of such features is particularly advantageous in applications in which corrections are sought to spoken user entries. An example of a presumption useful in limiting a number of candidate corrected user entries, is that an error resulting from a machine interpretation of a user's speech likely differs from an intended user entry by a common linguistic feature, such as common number of syllables and/or similarity of sounds or phonemes. Having an understanding of linguistics of one or more tokens of each of the entry-refinement pair $S_1$, $S_2$ can be provided to the alignment processor 226 to assist in limiting the number of alignments. For example, if the user entry $S_1$ includes a word, such as "Javanese," user refinement $S_2$ includes a word, such as "Japanese," only those alignments substituting tokens having the same or close number of syllables and/or phonemes such that a similar sounding word, for example, Japanese for Javanese, can be included in a collection of candidate alignments for the refined/corrected user entry string $S_3$.

Once a suitable collection of candidate alignments has been determined by the alignment processor 226, one of the candidate alignments representing the refined/corrected user entry $S_3$ most likely intended by a user must be selected from the alignments. Although each of the various approaches to interpreting the user entry-refinement/correction pair $S_1$, $S_2$ are described above as being useful to limiting the number of alignments generated by the alignment processor 226, in at least some implementations, one or more of the features determined by one or more of the interpreters 224, 230, 232, 234 can be used to assist in a rank ordering of or otherwise scoring the alignments. For example, alignments in which substituted tokens share one or more common features, such as semantics, linguistics, can be favored or otherwise rank ordered as more favorable (e.g., closer the top of a rank-ordered list of alignments). Such features can be identified by tags or associations arrived at after interpretation of the tokens.

In some implementations, ranking depends on a measure of edit distance. For example, alignments having a lower edit distance can be favored over those providing a greater edit distance. In determining a measure of edit distance, respective cost values can be assigned to edits, such as add, delete, or replace. A comparison of each alignment of the refined/corrected user entries can be compared to the original user entry, such that an estimate of a minimum number of edits, such as add, delete, replace applied to the original entry, that results in the refined/corrected entry. The assigned values for each of the estimated edits can be summed to obtain a measure of edit distance. Generally, an edit distance having a lower magnitude suggests a higher ranking alignment.

Alternatively or in addition, the selector 228 can examine one or more of the user entry-refinement/correction pairs $S_1$, $S_2$, the candidate list of possible refined/corrected alignments $S_3$'s and results obtained from one or more of the interpreters to determine a measure as to the likelihood that a particular candidate alignment or group of candidate alignments represents a refined/corrected user entry $S_3$. The selector 228 then selects one of the alignments as the refined/corrected user entry and forwards the entry to the application 112 (FIGS. 1A and 1B). In some implementations, selecting one of the candidate refined user entries includes generating a score for each candidate refined user entry. Such scores can be indicative of a quality of a candidate refined user entry. For example, a higher or a lower score can be used as an indicator of quality. At least one metric that can be used in determining such a score is an edit distance relating to an extent of edits required to arrive at the candidate refined/corrected user entry string $S_3$, starting with the corresponding user entry string $S_1$.

Other metrics that can be used in determining such scores include determined features of one or more tokens of each of the strings $S_1$, $S_3$, e.g., favoring candidate refined user entries resulting from substitution of tokens having at least one common feature. One or more such features include syntactic features, semantic features, or size.

Figure 2B:
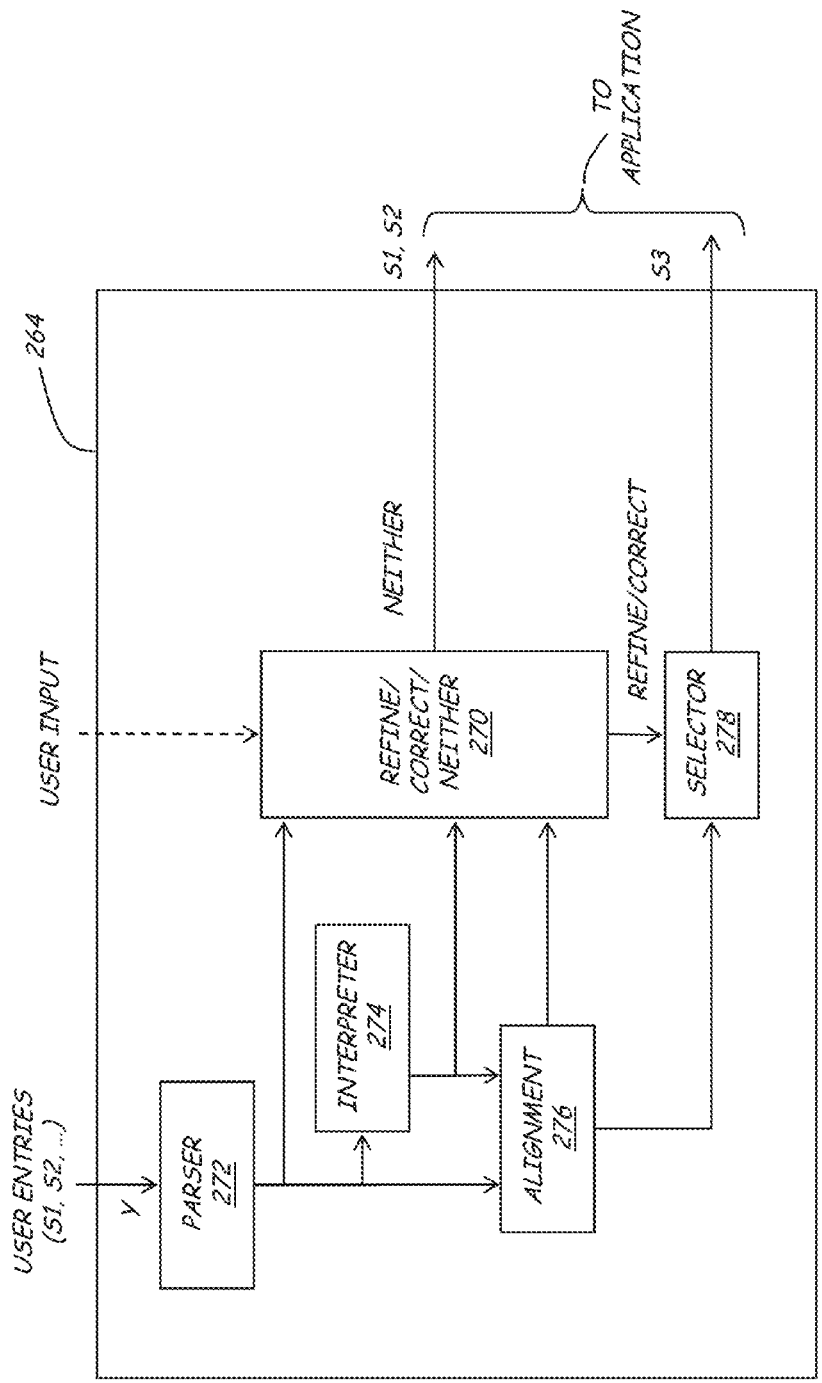
FIG. 2B shows a more detailed functional block diagram of an alternative implementation of a user refinement/correction engine.

Referring to FIG. 2B, a more detailed functional block diagram of an alternative implementation of a user refinement/correction engine 264 is shown. The refinement/correction engine 264 includes a parser 272 receiving user entries, $S_1$, $S_2$, and parsing such entries into tokens, for example, one word or multiple consecutive word tokens. The parsed user entries are provided to an interpreter 274 and to an alignment processor 276. The interpreter 274 can operate similarly to the interpreter 224 (FIG. 2A) described above. Likewise, the alignment processor 276 can operate similarly to the alignment processor 226 (FIG. 2A) described above.

Outputs from one or more of the parser 272, the interpreter 274, or the alignment processor 276 are provided as inputs to a refinement/correction discriminator 270.

The refinement/correction discriminator 270 determines whether two or more user entries are related as refinements or corrections. Such determinations can be reached by any suitable approach, such as the approaches described above in relation to the refinement/correction engine 214 of FIG. 2A. Upon a determination that entries do not correspond to refined/corrected entries, the user entries are passed along for further processing, for example, to an application, as shown. Upon a determination that the entries do correspond to refined/corrected entries, however, an indication is provided to an alignment selector 278. The alignment selector 278 receives one or more likely alignments from the alignment processor 276 and makes a selection according to any of the techniques described herein. The selected alignment $S_3$ is passed along for further processing, for example, to an application, as shown.

In at least some implementations, the refinement/correction discriminator 270 receives a user input (shown in phantom) allowing a user to manually indicate whether two or more user entries, $S_1$, $S_2$, are related as refinements/corrections. Such user inputs can include selection of a "button" or other suitable manipulator that can be actuated by the user as desired. For example, a "correction" button and/or a "refinement" button can be presented for a user. Upon a determination by the user that an initial user entry $S_1$ requires refinement or correction, the user simply selects the appropriate button, then proceeds to provide a subsequent user entry $S_2$. The refinement/correction engine 264 proceeds to process the alignments as appropriate based upon the user entries $S_1$, $S_2$ and user indication (refinement, correction).

Given a tuple $<S_1, S_2>$ and a set of candidate alignments $\{a_1, a_2, \ldots, a_n\}$, a maximum entropy model can be used to rank a quality of the suggested alignment a for a given user entry. A typical maximum entropy setup appears as follows: for notational brevity, the alignment variable a also includes information about $S_1$ and $S_2$.

$$p(y|a)=h(y|a)=Z(a)\exp\{\theta \cdot f(a,y)\} \qquad \text{Eqn. 1}$$

In this model, f is some feature function over the proposed alignment, θ represents a weighting over the features and y is the binary output class, which here is either "good alignment" or "bad alignment." Given this definition of output class, the relative magnitudes of h for different candidate alignments may be used to rank the candidate alignments against each other. The candidate selection problem then becomes $$\arg\max_a h(y=1|a) \qquad \text{Eqn. 2}$$

In an adversarial selection, the best alignment is sought between two entries. In such a regime, alignments yielding the same $S_3$ string compete against each other.

$$\arg\max_a p(y=1|a) \qquad \text{Eqn. 3}$$

The same adversarial selection can be marginalized over all alignments that produce the same $S_3$ string.

$$\arg\max_{S_3} \Sigma_{a:a\cdot or\cdot S_3} p(y=1|a) \qquad \text{Eqn. 4}$$

Rather than marginalizing over the alignments that produce a refine string, a union of their feature vectors can be taken and treated as a single point. When multiple alignments share a feature, the feature weight can be averaged across them.

$$\arg\max_{S3} p(y=1|U_{a:a\cdot or=S3}a) \qquad \text{Eqn. 5}$$

In at least some implementations, the refinement/correction engine 214 (FIG. 2A) is in communication with one or more training logs 236 (shown in phantom). Such logs 236 can be developed through a number of approaches, some of which are described herein, to retain triples $<S_1, S_2, S_3>$ of at least some of the more common combinations of user entries, refinement/correction entries and refined/corrected entries. In such instances, determining a refinement/correction can be reduced to a lookup of the user entry-refinement/correction pair $S_1$, $S_2$ in the user entry logs 236. Once a user entry-refinement/correction pair $S_1$, $S_2$ has been identified within the user entry logs 236, the associated refined/corrected user entry of the triple $<S_1, S_2, S_3>$ can be provided to the application 112 (FIGS. 1A and 1B), or otherwise featured prominently in any ranking of alignments. It is possible to update the user entry log(s) 236 with triples resulting from selections that may or may not have involved the user entry log(s) 236.

Some example techniques for automatically training or otherwise developing such user entry log(s) 236 are described herein.

Alternatively or in addition, the training logs 236 can be used to train such a refinement/correction engine 214 to recognize refined/corrected entries in response to user entries $S_1$ and refining/corrective user entries $S_2$. A learned model 240 (shown in phantom) can be prepared during a training mode operation in which the training logs 236 having related user entries corresponding to refined/corrected user entries, are processed, for example, by an alignment classifier 238, the results of such processing being captured in the learned model 240. Such learning can be accomplished off-line, for example, according to some maintenance cycle that can be implemented periodically to update the learned model 240 responsive to then current training logs 236. During runtime, user entries can be forwarded directly to the selector 228, without necessarily being subject to interpretation and alignment. The selector 228 accesses the learned model 240, for example, through the alignment classifier 238, to determine a refined/corrected user entry according to the various techniques described herein.

Figure 3:
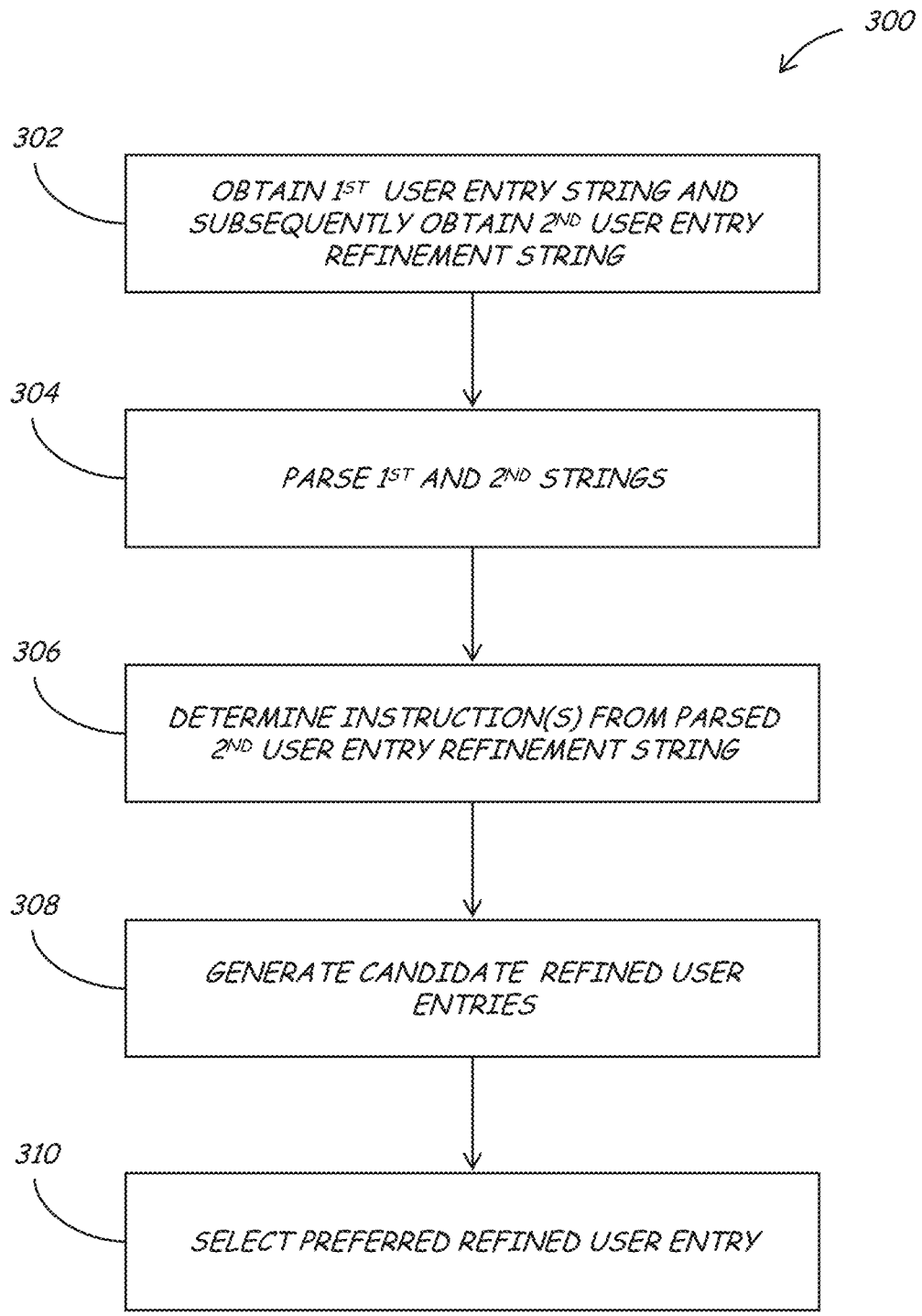
FIG. 3 shows a flowchart of some implementations of a process for refining a natural language user entry, responsive to a natural language user refinement.

FIG. 3 shows a flowchart of some implementations of a process 300 for refining a natural-language user entry, such as a natural-language voice user entry, responsive to a natural language user refinement. The process 300 includes obtaining a first entry string $S_1$ and subsequently obtaining a second user entry string $S_2$ at 302. For example, each of the entry strings can be generated by a user interface 102 (FIG. 1A) in response to obtaining a user entry. Each of the first and second user entry strings $S_1$, $S_2$ is respectively parsed into tokens at 304, for example, by a parser 222 of refinement/correction engine 214 (FIG. 2A). A refining instruction is determined from the parsed second user entry refinement string $S_2$ at 306, for example, by an interpreter 224 (FIG. 2A). One or more candidate refined user entries are generated at 308, for example, by an alignment processor 226 (FIG. 2A). A refined user entry is selected from the one or more candidate refined user entries at 310, for example, by the selector 228 (FIG. 2A), and outputted by the selector 228.

Figure 4A:
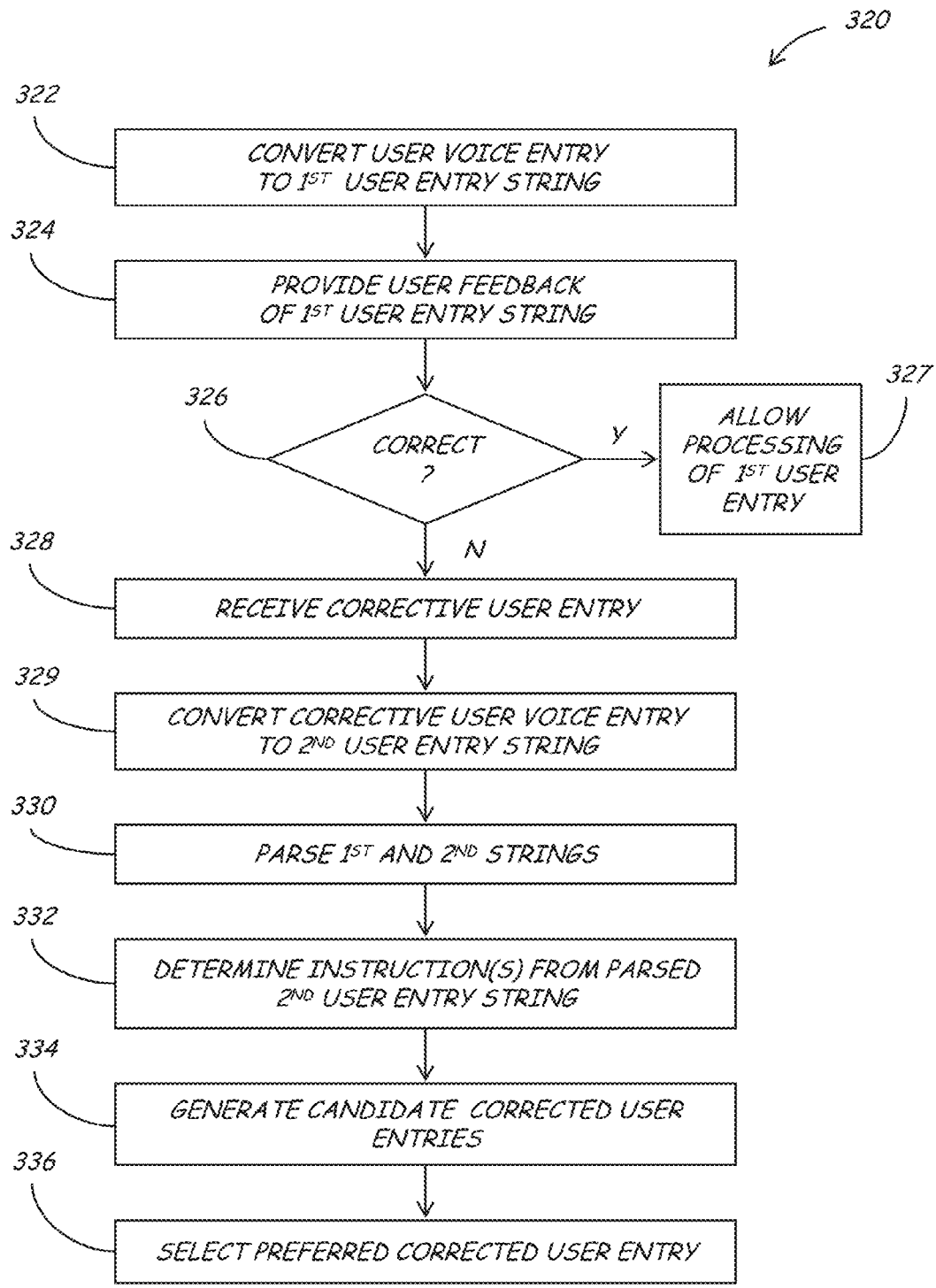
FIG. 4A shows a flowchart of some implementations of a process for correcting a natural language user voice entry, responsive to a natural language user voice instruction.

FIG. 4A shows a flowchart of some implementations of a process 320 for correcting a natural language user voice entry, responsive to a natural language user voice instruction. A user voice entry, such as speech, is converted to a first user entry string at 322, for example, by a speech recognizer 118 (FIG. 1B). User feedback of the first user entry string is provided at 324, for example, by a feedback device 108 (FIG. 1B). A determination as to whether the first user entry string is a correct rendition of the user voice entry is made at 326. Such a determination can be made, for example, by a user 110 (FIG. 1B) after observance of the user feedback. To the extent that the conversion at 322 is accurate, no corrections are necessary and the user entry can be allowed to process normally at 327, for example, being forwarded to an application 112 (FIGS. 1A and 1B). However, to the extent it is determined at 326 that the conversion at 322 is not accurate, a corrective user entry is received at 328. Such a corrective user voice entry is converted to a second user entry string at 329, for example, by the speech recognizer 118. The first and second user entry strings $S_1$, $S_2$ are parsed into tokens at 330, for example, by a parser 222 of refinement/correction engine 214 (FIG. 2A). As described above, the tokens can be individual words of a string, or groups of consecutive words, referred to as n-grams. A corrected instruction is determined from the parsed second user entry refinement string at 332, for example, by an interpreter 224 (FIG. 2A). One or more candidate corrected user entries are generated at 334, for example, by an alignment processor 226 (FIG. 2A). One of the one or more candidate corrected user entries is selected at 336, for example, by the selector 228 (FIG. 2A).

Figure 4B:
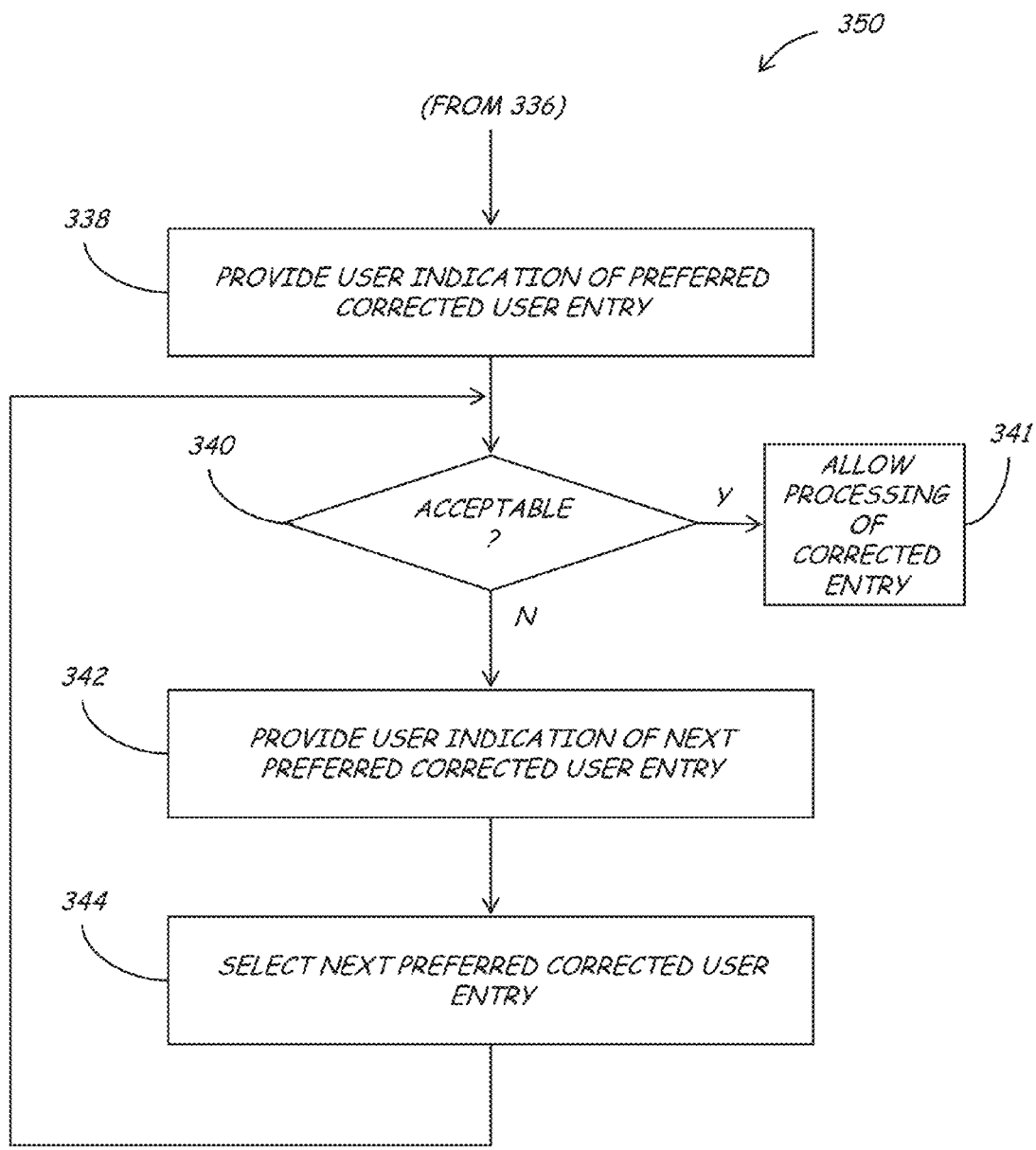
FIG. 4B shows a flowchart of an extension to the process illustrated in FIG. 4A, in which subsequent corrected user entries can be selected in favor of an initially corrected user entry.

FIG. 4B shows a flowchart of an extension 350 to the process 320 illustrated in FIG. 4A, in which a subsequent one of the one or more candidate corrected user entries can be selected in favor of an initially selected candidate corrected user entry. Continuing from selection of a corrected user entry at 336, a user is provided with an indication of the corrected entry at 338, for example, by a feedback device 108' (FIG. 1B). A determination as to whether selection of the corrected user entry is acceptable is accomplished at 326, for example, by a user 110 (FIG. 1B) after observing any such feedback. To the extent that the selection at 336 (FIG. 4A) is accurate, no further corrections are necessary and the candidate corrected user entry can be allowed to process normally at 341, for example being forwarded to an application 112 (FIGS. 1A and 1B). However, to the extent it is determined at 340 that the selection at 336 is not acceptable, a user indication of the next user entry is provided to the user at 342, for example, by the feedback device 108'. The process can repeat selection of a next corrected user entry at 344, if the previously selected next user entry remains unacceptable 340. Although the illustrative example is described in relation to further correction of the initial selected corrected candidate user inputs, a similar approach can be used to further refine the initial refined candidate user inputs.

Figure 5:
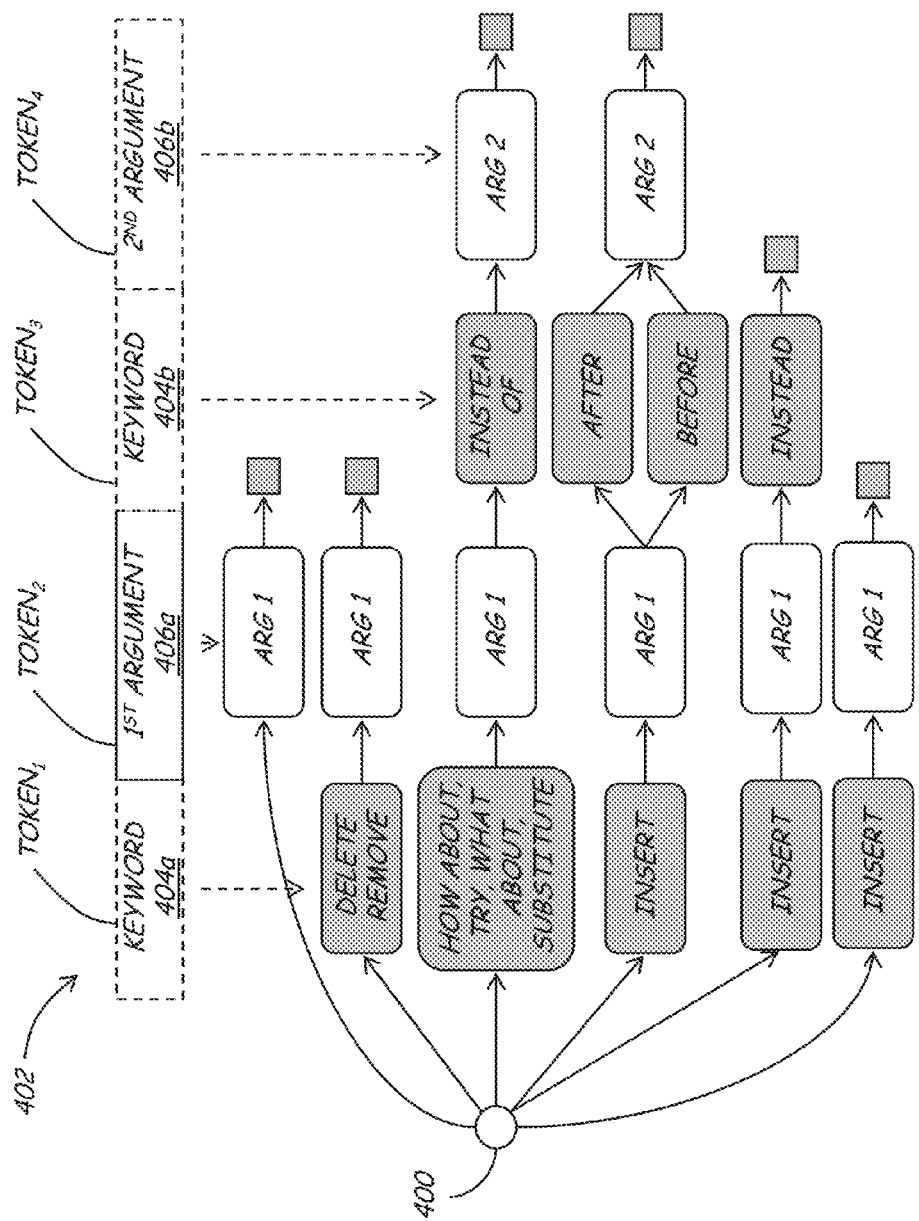
FIG. 5 shows a schematic diagram of examples of parsed natural-language refinements to a user entry.

FIG. 5 shows a schematic diagram of examples of parsed natural-language refinements to a user entry 402. In the illustrative example, the user entry, a corrective user entry string $S_2$, is parsed into one or more tokens, e.g., $Token_1$, $Token_2$, $Token_3$, $Token_4$. The tokens can be individual words of the user entry string 402, or groups of consecutive words, also referred to herein as n-grams. Once suitably parsed, one or more of the tokens can be inspected to determine features, as described herein. In the illustrative example, the tokens can be distinguished as being keywords 404a, 404b or not keywords. In some implementations, tokens presumed not to be keywords can be presumed to represent arguments 406a, 406b for the purposes of further processing, such as further feature analysis and/or alignment processing. An initial list of example keywords is shown aligned under keyword 404a, including "Delete;" "Remove;" "Try;" "Substitute" and "Insert." Some keywords correspond to multi-word phrases (n-grams), such as "How about" and "What about." Such keywords, once identified, can provide the refinement/correction engine 214 (FIG. 2A) with an indication whether an instruction relates to one of: (i) an insertion, (ii) a deletion, or (iii) a substitution. Knowledge of such a related instruction provides insight to an alignment processor 226 (FIG. 2A) to limit or otherwise feature prominently favored alignments in any generated listing of alignments. In some implementations, such instructions can be inferred. For example, a simple corrective user entry string of "ARG 1" without any keywords, can be inferred as a substitution.

By way of further example, a keyword of "Delete" or "Remove" and a first argument 406a of "ARG 1" determined from a refining user entry $S_2$, can be used to form alignments of candidate refined user entries $S_3$, by selectively deleting or otherwise removing the argument 406a "ARG 1" from the initial user entry $S_1$. Likewise, a keyword of "Insert" and a first argument 406a of "ARG 1" determined from a refining user entry $S_2$, can be used to form alignments of candidate refined user entries $S_3$, by selectively inserting the argument 406a "ARG 1" at various locations within the initial user entry $S_1$. Similarly, a keyword of "Substitute" and a first argument 406a of "ARG 1" determined from a refining user entry $S_2$, can be used to form alignments of candidate refined user entries $S_3$, by selectively replacing tokens of the initial user entry $S_1$ with the argument 406a "ARG 1." In some implementations, all possible combinations are determined as possible alignments. Alternatively or in addition, one or more features of one or more of the argument 406a "ARG 1" and the tokens of the initial user entry $S_1$ can be used to limit or otherwise feature prominently favored alignments in any generated listing of alignments. For example, such substitutions can be limited to substitutions sharing one or more of semantic and linguistic attributes.

In at least some instances, one or more keywords 404b determined from a refining user entry $S_2$ provide guidance on how to implement the user's intention in determining the intended refined user entry $S_3$. For example, keywords such as: "Before," "After," and "Instead of" followed by a second argument 406b "ARG 2" facilitate locations of a substitution or insertion of a first argument 406a "ARG 1" of the refining user entry $S_2$ within the initial user entry $S_1$. Namely, alignments of candidate refined user entries $S_3$ can be determined by inserting the first argument 406a "ARG 1" "before" "after" or "instead of" the second argument 406b "ARG 2" of the initial user entry $S_1$ according to the first and second keywords 404a.

Keyword of simply "Instead" in combination with a first argument can be interpreted as a substitution, such that preparation of alignments of candidate refined user entries $S_3$ are prepared by selectively replacing tokens of the initial user entry $S_1$ with the argument 406a "ARG 1." In some implementations, all possible combinations are determined as possible alignments. Alternatively or in addition, one or more features of one or more of the argument 406a "ARG 1" and the tokens of the initial user entry $S_1$ can be used to limit or otherwise feature prominently favored alignments in any generated listing of alignments. For example, such substitutions can be limited to substitutions sharing one or more of semantic and linguistic attributes.

Although the processing devices 104 of FIGS. 1A and 1B suggest that the refinement and correction engines 114, 114' can be included within or otherwise hosted on the processing device 104, it is understood that all or part of such refinement and correction engines 114, 114' can be remote from the processing device 104. For example, in a client-server scenario, one or more elements of the refinement and correction engines 114, 114' can be located on a remote server, such as a shared server, accessible from a client processing device, such as a desktop computer, a laptop computer, a tablet computer, a mobile telephone, a smart phone, a personal data assistant and generally any device configured to automatically accept user input, for example voice activated appliances.

By way of further example, a grammar interpreter 224 (FIG. 2A) can be beneficial for the following string, $S_2$: "Add cheap before French," given the string $S_1$: "French restaurants in New York." A keyword "Add" identifies the instruction as an insertion of the argument "cheap," and identifies location of the added argument as "before" the second argument, "French." The resulting refined user entry is $S_3$: "Cheap French restaurants in New York." With little or no ambiguity as to other alignments. Other example instructions include $S_2$: "Delete French," resulting in $S_3$: "Restaurants in New York" and $S_2$: "Try Italian instead of French" resulting in $S_3$: "Italian restaurants in New York."

Figure 6:
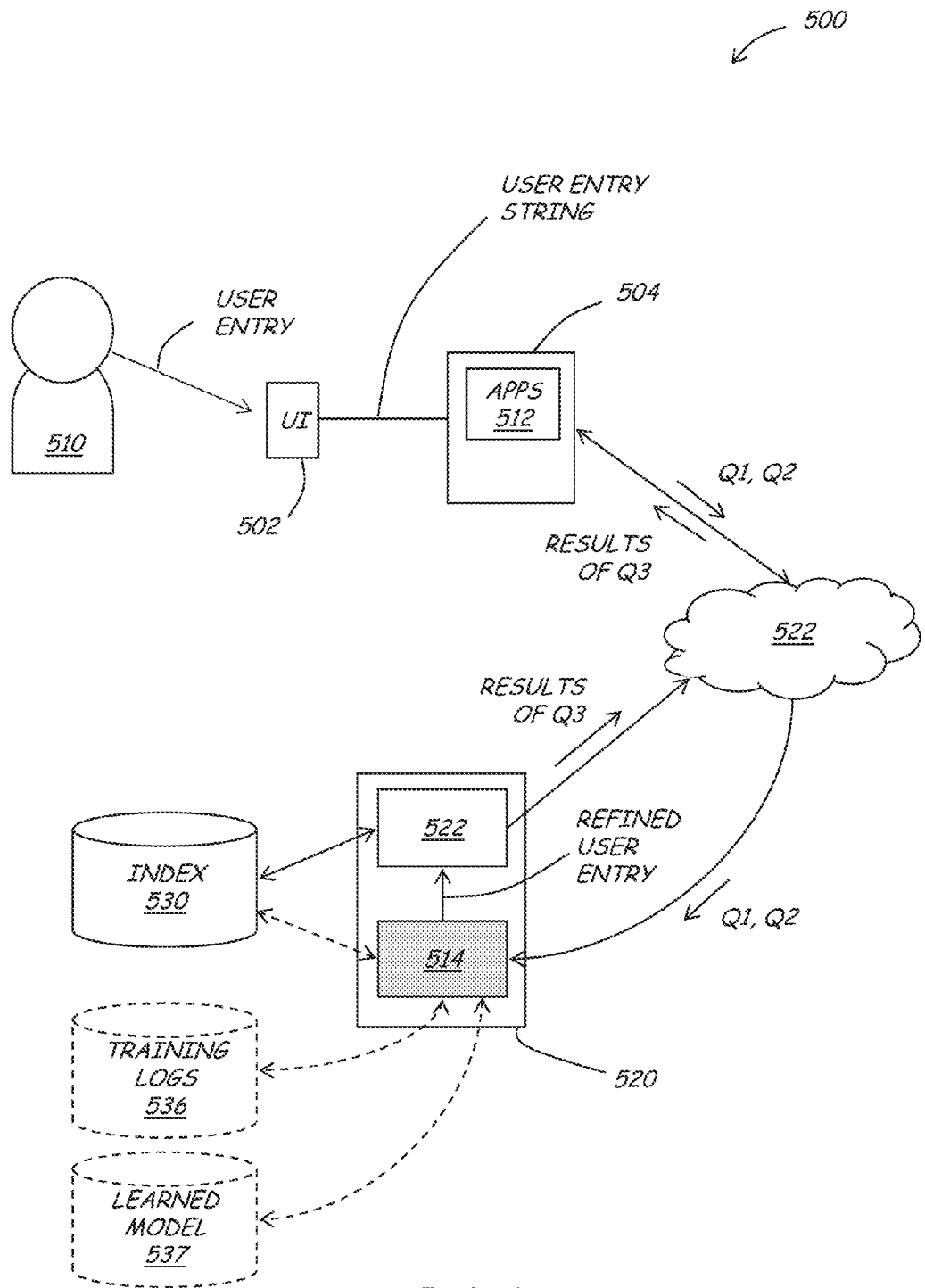
FIG. 6 shows a functional block diagram of another implementation of a system for refining a user entry in response to natural language instruction.

FIG. 6 shows a functional block diagram of another implementation of a system 500 for refining a user entry in response to natural language instruction. The system 500 includes a user interface 502 and a web-enabled processing device 504.

The user interface 502 is configured to accept a user entry, such as speech, text, cursor position, or gesture, and encode the user entry as may be required for processing by the web-enabled processing device 504. User entries, particularly natural-language user entries include words that may be spoken or typed. The user interface 502 receives a natural-language entry from a user 510 and encodes for further processing. At least one example of such encoding is a character string representative of the user entry. In at least some implementations, the user interface 502 also includes a user feedback device adapted for providing the user 510 with some form of feedback, for example, audio, text, graphics.

In the illustrative example, the web-enabled processing device 504 includes one or more applications 512. The one or more applications 512 can include traditional applications, such as web browsers, email, short message service communications, word processors, and the like. More generally, the applications 512 can include any process accessible to the user 510 through the user interface 502. For example, the application 512 can include processes hosted by the web-enabled processing device 504, such as an operating system, as well as web-accessible processes, such as search engines (not shown).

In the illustrative example, a user entry refinement engine 514 is located on a remote server 520. The web-enabled processing device 504 can communicate with the remote sever 520 through any suitable form of communications, including combinations of one or more dedicated and shared networks. In the illustrative example, the remote server is in communication with the web-enabled processing device 504 through the Internet 522. In at least some implementations, the remote server 520 also includes one or more applications 523. In at least some instances, the applications 512, 523 can represent client-server applications.

By way of illustrative example, the local application 512 on the web-enabled processing device 504 corresponds to a web browser and the remote application 523 corresponds to a search engine. In at least some instances, a user entry accepted by the user interface 502 corresponds to a search query, which is converted to a first string $Q_1$. The user 510 provides a subsequent user entry corresponding to a refining instruction to the original search query $Q_1$, which is converted to a second string $Q_2$. Each of the first and second strings $Q_1$, $Q_2$ is forwarded to the remote server 520 via the Internet 522. At the remote server 520, the user entry refinement engine 514 receives the strings, and determines a string $Q_3$ corresponding to the first query $Q_1$ as refined or otherwise corrected by the refining instruction $Q_2$. The refined/corrected query $Q_3$ is provided by the user entry refinement engine 514 to the search engine 523, rather than either of the first and second strings $Q_1$, $Q_2$. The search engine 523, in turn, responds to the refined/corrected query $Q_3$ as if it were the only query received from the user 510, returning corresponding search results to the web browser 512. Also shown is a search index 530 in communication with the search engine 523, from which search results can be obtained.

In at least some implementations, the system 500 includes training logs 536, for example, storing associations of user entries ($Q_1$), one or more of refining/corrective user entries ($Q_2$), and refined/corrected user entries ($Q_3$). Such logs can be updated, for example, routinely during operation of the system 500. The training logs 536 can be used to allow the user entry refinement engine 514 to learn from initial search queries and subsequently refined or corrected search queries for multiple users, in order to develop a model suitable to aid in the identification of a triple of the original search string $Q_1$, a refined or corrected search string $Q_3$ and a refining or corrective instruction $Q_2$. The learned model 537 can be stored, for example, in a memory or other suitable storage device accessible by the remote server 520.

Figure 7:
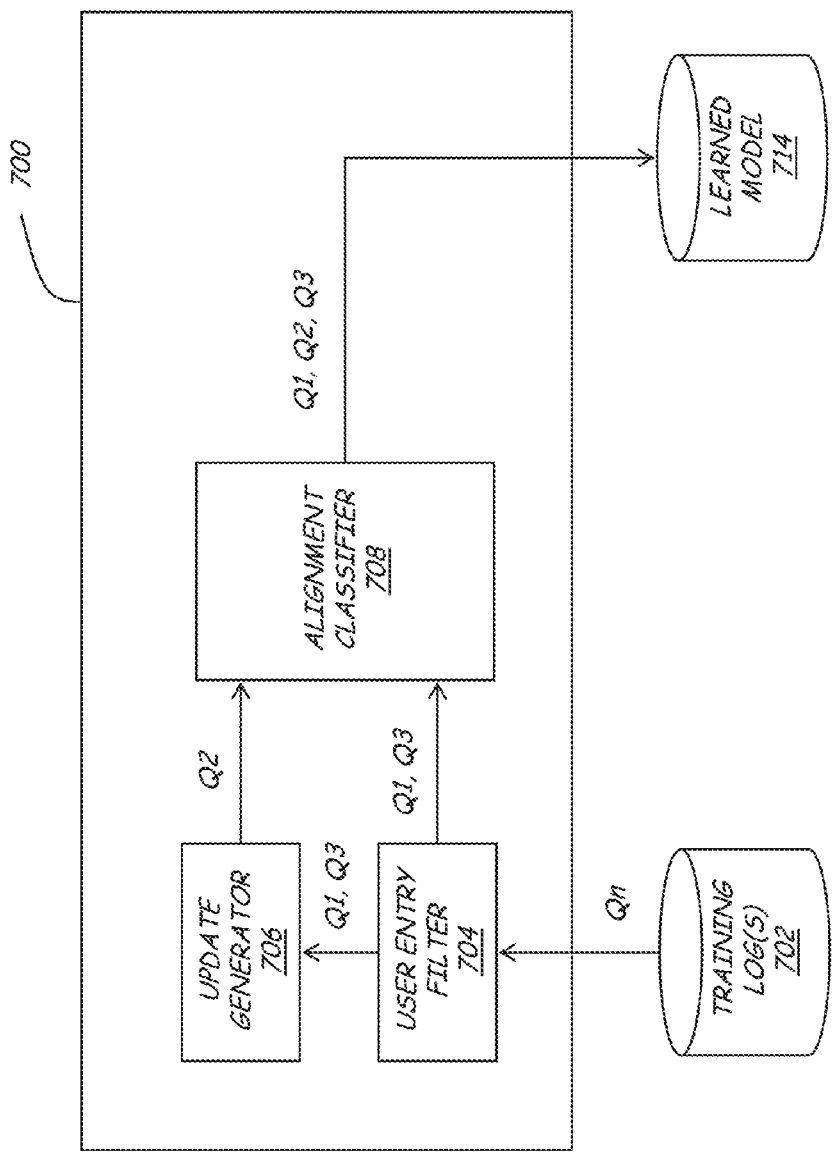
FIG. 7 shows a functional block diagram of some implementations of a user entry training log processor.

FIG. 7 shows a functional block diagram of some implementations of a user entry training log generator 700. The training log generator 700 includes a user entry filter 704 in communication with user training logs 702, such as the training logs 536 (FIG. 6) described above. The user entry filter 704 can be configured to determine whether consecutive log entries correspond to an initial user entry and refined or corrected user entries $Q_1$, $Q_3$, as distinguished from independent user entries. Such determinations can be arrived at from one or more of a time delay between successive entries and features of one or both of the entries. For example, determination of refined/corrected user entries can be accomplished in similar manners to those described above in relation to operation of the refinement engine 114 (FIG. 1A).

In some implementations, the user entry filter 704 passes those consecutive entries determined to represent an initial user entry $Q_1$ and a refined or otherwise corrected user entry $Q_3$ to each of an update generator 706 and an alignment classifier 708. The update generator 706 determines one or more approximations of a refining or corrective instruction $Q_2$ and the alignment classifier 708 forms classifications corresponding one or more associations, such as triples $<Q_1, Q_2, Q_3>$ for a given $Q_1, Q_3$. The one or more triples $<Q_1, Q_2, Q_3>$ or similar classifications can be captured or otherwise represented in a learned model 714. Aspects of machine learning and particularly those used in speech or linguistic processing can be applied by the alignment classifier 708 and captured in the model 714. In at least some implementations, the learned model 714 represents some level of generalization of the one or more triples, such that the model 714 can be used during run time to provide refined/corrected entries responsive to a range of user entries $Q_1$ and refining/corrective user entries $Q_2$ that approximate the triple, without necessarily requiring a perfect or even near perfect "match." At least some examples of such systems include maximum entry, and vector quantization.

In at least some implementations, the training log 702 corresponds to query logs of a search engine, in which prior search queries over some predetermined search period, such as a day, a week, a month are mined or otherwise processed as described above. Namely, the query logs 702 can be mined to identify consecutive query log entries that correspond to initial user entries and refined or corrective user entries $Q_1$, $Q_3$ and corresponding triples $<Q_1, Q_2, Q_3>$, or at least estimates of such triples. The resulting triples can be processed by the alignment classifier 708 and stored in a learned model 714. The learned model 714 can support runtime operation of the user entry refinement engine 514. Thus, during runtime, the user entry refinement engine 514 determines that it has received a user entry $Q_1$ and a refining or corrective user entry $Q_2$. The user entry refinement engine 514 then consults the learned model 714, 537 (FIG. 6) to identify one or more previously identified triples $<Q_1, Q_2, Q_3>$. Any such triples can be further processed, as necessary to distinguish a triple of more than one candidate triple. If no triple is determined from the training log 536, the user entry refinement engine 514 can proceed to determine a refined or otherwise corrected user entry $Q_3$, determining a new triple, as described herein, for example, using the features of the user entry refinement engine 214 (FIG. 2A). It should be appreciated that such learned models 537, 714 can be consulted directly, without having to prepare and/or score alignments, providing a proposed refined and/or corrected user entry. In at least some implementations, such model consultation can be accomplished without having to parse any of the user entries.

Figure 8:
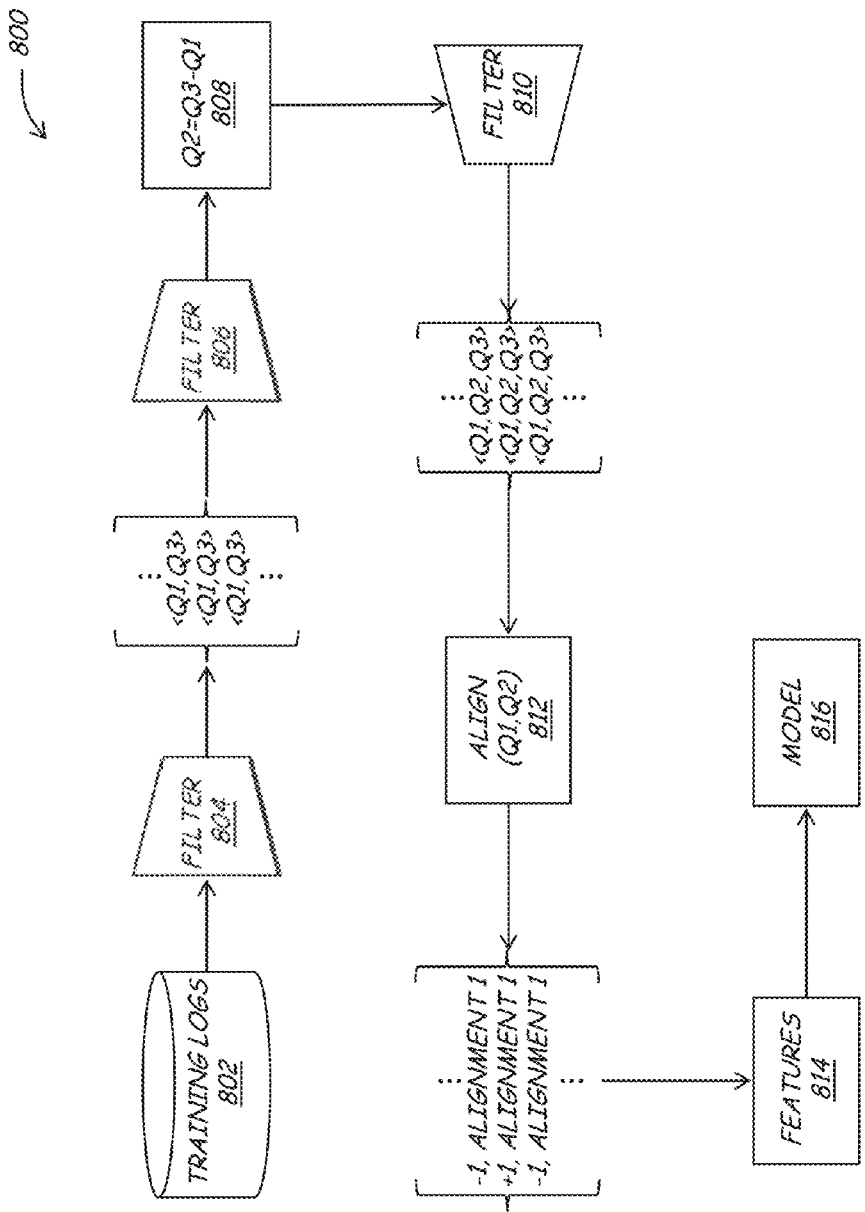
FIG. 8 shows a functional block diagram of some implementations of a user entry training log processor.

FIG. 8 shows a functional block diagram of some implementations of a user entry training log processor 800. The training log processor 800 receives indications of user input from training logs 802, such as the query logs referred to above, providing user query $Q_1$ and refined user query $Q_3$ pairs. A first filter 804 processes consecutive training log entries 802 to determine whether such consecutive log entries correspond to a $<Q_1, Q_3>$ pair. Any suitable techniques can be employed for making such a determination, such as the techniques described above in relation to operation of the entry refinement/entry correction engines 114, 114'. In at least some implementations, the $<Q_1, Q_3>$ pairs are processed by a second filter 806. For example, the second filter can allow only those pairs occurring more than some threshold number of times, such as 10 times, 50 times, 100 times, 500 times or more—within the training logs 802 to proceed for further processing.

The filtered pairs $<Q_1, Q_3>$ are forwarded to a refinement/correction processor 808 that determines an estimate of a refining or corrective user entry $Q_2$ that would or otherwise could give rise to the refined/corrected user entry $Q_3$, in view of the original user entry $Q_1$. In the illustrative example, at least one such process includes estimating the refining or corrective user entry $Q_2$ as a difference between the refined/corrected user entry $Q_3$ and the original user entry $Q_1$, $Q_2=Q_3-Q_1$. Such a difference can be determined at a token level for parsed user entries.

A third filter 810 can be applied to an output of the refinement/correction processor 808 to limit those resulting estimations of the refining/corrective user entry $Q_2$. In the illustrative example, the third filter 810 eliminates or otherwise retains or forwards refining/corrective user entries $Q_2$, in which $Q_2$ is a contiguous span in $Q_3$, for example to remove so-called "shotgun" updates. Thus, candidate refined/corrected user entries $Q_3$ in which tokens or words from $Q_2$ appear separated with other tokens or words interspersed in between, can be removed. Alternatively or in addition, the third filter 810 eliminates or otherwise retains or forwards refining/corrective user entries $Q_2$, in which the original user entry $Q_1$ does not appear as a contiguous span within the candidate refined/corrected user entries $Q_3$. Such filtering would, for example, remove "inserts" in which one or more tokens are simply inserted or otherwise appended to the original user entry $Q_1$. Alternatively or in addition, the third filter 810 eliminates or otherwise retains or forwards refining/corrective user entries $Q_2$, in which $Q_2$ is not equivalent to $Q_3$. Such instances might be, for example, suggestive that the second user entry $Q_2$ is simply unrelated to the original user entry, and therefore not indicative of a refinement/correction to the original user entry.

The filtered triples $<Q_1, Q_2, Q_3>$ are forwarded to an alignment processor 812 that prepares alignments and provides some indication as to suitability of such alignments. In machine learning applications, such alignments can be scored or otherwise tagged with an indication as to favorability, such as binary indicator, +1, −1; 0, 1; −1, 0; or the like. Other features of the alignments can be analyzed in a feature analyzer 814, and results captured in a learned model 816, to support refinements/corrections of user entries during runtime.

Figure 9:
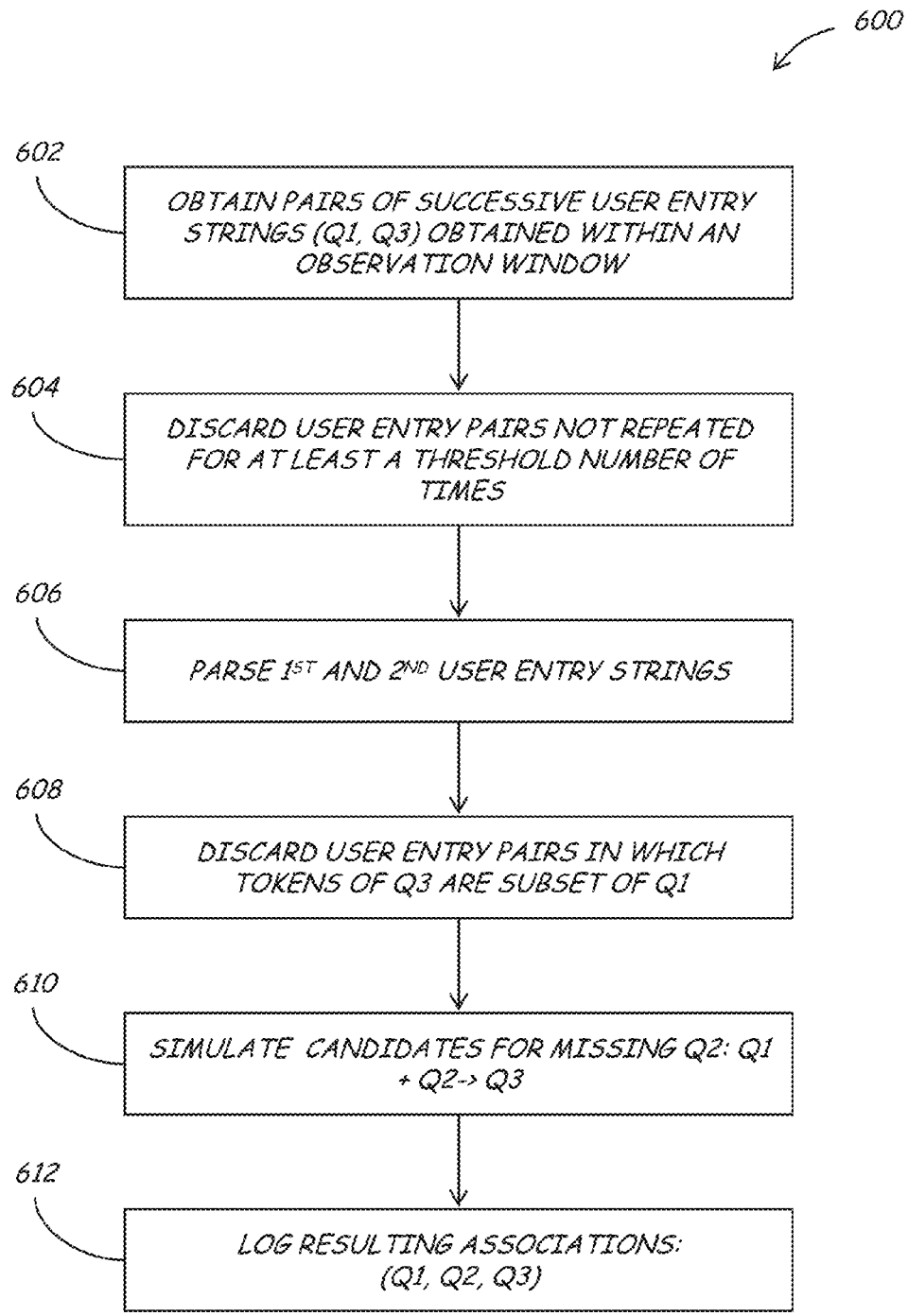
FIG. 9 shows a flowchart of some implementations of a process for updating a user entry training log.

FIG. 9 shows a flowchart of some implementations of a process 600 for generating or otherwise updating a learned model 714 (FIG. 7), responsive to user entries obtained from a user entry training log. Pairs of successive user entry strings, e.g., $Q_1, Q_3$, are obtained within an observation window— e.g., time period—at 602. Such pairs can be obtained from training logs 702 (FIG. 7), such as the query logs 536 (FIG. 6). User entry pairs not repeated for at least a threshold number of times can be discarded, or otherwise ignored at 604, for example, by the user entry filter 704 (FIG. 7). First and second user entry strings are parsed at 606, for example, by an update generator 706 (FIG. 7). User entry pairs in which tokens of $Q_3$ are a subset of $Q_1$ at 608 can be discarded, for example, by the update generator 706. Candidates for missing $Q_2$: $Q_1+Q_2 \rightarrow Q_3$ can be simulated at 610, for example, by the update generator 706. Resulting associations, e.g., triples $<Q_1, Q_2, Q_3>$ can be logged or otherwise used to update a learned model at 612, for example, by an alignment classifier 708 (FIG. 7).

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as to include one or more computer program products, i.e., one or more modules of computer program instructions encoded on a tangible program carrier for execution by, or to control the operation of, one or more data processing apparatus/processors. The tangible program carrier can be a computer-readable medium. The computer-readable medium can be, for example, a machine-readable storage device, a machine-readable storage substrate, a memory device, a composition of matter affecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The one or more of the processes and logic flows described in this specification can be performed by one or more programmable processors executing one or more computer programs to perform functions by operating on input data and generating output. The one or more of the processes and logic flows can also be performed by, and apparatus can also be implemented as, special purpose logic circuitry, e.g., an FPGA (field programmable gate array) or an ASIC (application-specific integrated circuit), including combinations of processes and apparatus.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., such as a mobile telephone, a personal digital assistant (PDA), a tablet device, a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Whereas many alterations and modifications of the systems, devices and techniques described herein will no doubt become apparent to a person of ordinary skill in the art after having read the foregoing description, it is to be understood that the particular implementations shown and described by way of illustration are in no way intended to be considered limiting. Further, the systems, devices and techniques have been described with reference to particular implementations, but variations within the spirit and scope of the disclosure will occur to those skilled in the art. It is noted that the foregoing examples have been provided merely for the purpose of explanation and are in no way to be construed as limiting. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

We claim:

1. A method, comprising:
receiving, by one or more processors of a data processing apparatus, a first string related to a natural-language voice user entry and a second string including at least one natural-language refinement to the user entry,
the first string and the second string being a pair of successive user entry strings;
parsing, by the one or more processors of the data processing apparatus, the first string into a first set of one or more tokens and the second string into a second set of one or more tokens;
determining, by the one or more processors of the data processing apparatus, at least one refining instruction from the second set of one or more tokens;
generating, by the one or more processors of the data processing apparatus, a plurality of candidate refined user entries based on the first string, the second string, and the at least one refining instruction,
each of the plurality of candidate refined user entries being generated based on at least a portion of each of the first string and the second string,
each of the plurality of candidate refined user entries being different than the first string and the second string;
selecting, by the one or more processors of the data processing apparatus, a refined user entry from the plurality of candidate refined user entries; and
outputting, by the one or more processors of the data processing apparatus, the refined user entry.

2. The method of claim 1, where each candidate refined user entry, of the plurality of candidate refined user entries, includes a respective combination of one or more tokens from each of the first string and the second string.

3. The method of claim 1, where selecting the refined user entry of the plurality of candidate refined user entries includes:
generating a score for each candidate refined user entry of the plurality of candidate refined user entries,
the score being indicative of a quality of the candidate refined user entry of the plurality of candidate refined user entries, and
selecting one of the plurality of candidate refined user entries based on the score of the one of the plurality of candidate refined user entries.

4. The method of claim 3, where generating the score includes determining a measure of edit distance between each candidate refined user entry, of the plurality of candidate refined user entries, and the first string.

5. The method of claim 1, further comprising limiting a number of candidate refined user entries generated based on the at least one refining instruction.

6. The method of claim 1, where selecting the refined user entry of the plurality of candidate refined user entries includes:
determining one or more features of at least one of the one or more tokens of each of the first string and the second string; and
selecting one of the plurality of candidate refined user entries resulting from substitution of tokens having at least one common feature of the one or more features.

7. The method of claim 6, where the one or more features include one or more of: syntactic features or semantic features.

8. The method of claim 1, further comprising providing the refined user entry to a search engine, the refined user entry corresponding to a search query.

9. A system, comprising:
one or more computers to:
receive a first string related to a natural-language voice user entry and a second string including at least one natural-language refinement to the user entry,
the first string and the second string being a pair of successive user entry strings;
parse the first string into a first set of one or more tokens and the second string into a second set of one or more tokens;
determine at least one refining instruction from the second set of one or more tokens;
generate a plurality of candidate refined user entries based on the first string, the second string, and the at least one refining instruction,
each of the plurality of candidate refined user entries being generated based on at least a portion of each of the first string and the second string,
each of the plurality of candidate refined user entries being different than the first string and the second string;
select a refined user entry from the plurality of candidate refined user entries; and
output the refined user entry.

10. The system of claim 9, where the one or more computers, when determining the at least one refining instruction, are to identify grammatical features from the second set of one or more tokens.

11. The system of claim 9, where the one or more computers are further to interpret semantic features from the first set of one or more tokens and the second set of one or more tokens.

12. The system of claim 9, where the one or more computers, when generating the plurality of candidate refined user entries, are to use information from a learned model, trained from user entry logs, to generate the plurality of candidate refined user entries.

13. The system of claim 12, where the user entry logs are search engine query logs.

14. A method performed by one or more computers, the method comprising:
receiving, from a log of user entry strings, a plurality of pairs of successive user entry strings, in which a second user entry string, of each respective pair of successive user entry strings, corresponds to a refinement of a first user entry string of the respective pair of successive user entry strings;
parsing each of the first user entry string and the second user entry string, of a respective pair of successive user entry strings, into one or more tokens;
discarding, from logging an association, pairs of successive user entry strings, in which tokens of the second user entry string of the pair of successive user entry strings are substantially a subset of tokens of the first user entry string of the pair of successive user entry strings;
generating a third string, for a non-discarded pair of successive user entry strings, comprising at least one natural-language refinement adapted to produce the second user entry string of the non-discarded pair of successive user entry strings when applied to the first user entry string of the non-discarded pair of successive user entry strings; and
logging the association of the non-discarded pair of user entry strings and the generated third string.

15. The method of claim 14, further comprising discarding, from logging the association, pairs of user entry strings not repeated at least a threshold number of times.

16. The method of claim 14, where each pair of successive user entry strings, of the plurality of pairs of successive user entry strings, was logged in the log of user entry strings within a respective period of time.

17. A non-transitory computer-readable storage medium encoded with instructions, the instructions comprising:
a plurality of instructions which, when executed by one or more processors, cause the one or more processors to:
receive a first string related to a natural-language voice user entry and a second string including at least one natural-language refinement to the user entry,
the first string and the second string being a pair of successive user entry strings;
parse the first string into a first set of one or more tokens and the second string into a second set of one or more tokens;
determine at least one refining instruction from the second set of one or more tokens;
generate a plurality of candidate refined user entries based on the first string, the second string, and the at least one refining instruction,
each of the plurality of candidate refined user entries being generated based on at least a portion of each of the first string and the second string,
each of the plurality of candidate refined user entries being different than the first string and the second string;
select a refined user entry from the plurality of candidate refined user entries; and
output the refined user entry.

18. The non-transitory computer-readable storage medium of claim 17, where the at least one refining instruction includes at least one of a delete instruction, an insert instruction, or a substitute instruction.

19. The non-transitory computer-readable storage medium of claim 17, where one or more instructions, of the plurality of instructions, to determine the at least one refining instruction include one or more instructions which, when executed by the one or more processors, cause the one or more processors to identify, within the second set of one or more tokens, one or more keywords indicative of the at least one refining instruction.

20. The non-transitory computer-readable storage medium of claim 17, where one or more instructions, of the plurality of instructions, to determine the at least one refining instruction include one or more instructions which, when executed by the one or more processors, cause the one or more processors to determine the at least one refining instruction from the second set of one or more tokens.

* * * * *